US007343374B2

(12) United States Patent
Berkhin

(10) Patent No.: US 7,343,374 B2
(45) Date of Patent: Mar. 11, 2008

(54) COMPUTATION OF PAGE AUTHORITY WEIGHTS USING PERSONALIZED BOOKMARKS

(75) Inventor: Pavel Berkhin, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 448 days.

(21) Appl. No.: 10/812,719

(22) Filed: Mar. 29, 2004

(65) Prior Publication Data

US 2005/0216533 A1  Sep. 29, 2005

(51) Int. Cl.
*G06F 17/30* (2006.01)
(52) U.S. Cl. .......................................... 707/5; 707/204
(58) Field of Classification Search ................ 707/3–7, 707/204; 715/501.1
See application file for complete search history.

(56) References Cited

U.S. PATENT DOCUMENTS

| 6,285,999 | B1 * | 9/2001 | Page ............................... | 707/5 |
| 6,799,176 | B1 * | 9/2004 | Page ............................... | 707/5 |
| 7,028,029 | B2 * | 4/2006 | Kamvar et al. ................ | 707/5 |
| 7,058,628 | B1 * | 6/2006 | Page ............................... | 707/5 |
| 7,076,483 | B2 * | 7/2006 | Preda et al. ................... | 707/5 |
| 7,080,073 | B1 * | 7/2006 | Jiang et al. .................... | 707/7 |
| 2005/0171946 | A1 * | 8/2005 | Maim ............................. | 707/5 |

OTHER PUBLICATIONS

Page et al., "The PageRank Citation Ranking: Bringing Order to the Web", internet citation, Jan. 29, 1998, XP0221358.*
Haveliwala et al., "Topic Sensitive PageRank", internet citation, May 7, 2002, pp. 1-17.*
Carriere, S. Jeromy, "WebQuery: searching and visualizing the Web through connectivity" *Computer Networks and ISDN Systems* (1997) pp. 1257-1267.
Haveliwala, Taher H., XP-002325894, "Topic-Sensitive PageRank", *ACM* (2002) pp. 1-17.
Li, Wen-Syan et al., "PowerBookmarks: a system for personalizable Web information organization, sharing, and management" *Computer Networks* (1999) pp. 1375-1389.
XP-002213518, "The PageRank Citation Ranking: Bringing Order to the Web" (1998) pp. 1-17.
Notification of Transmittal of the International Search Report and the Written Opinion of the International Searching Authority, or the Declaration as received in corresponding PCT international application No. PCT/US2005/010188.
Almeida, Rodrigo B., et al., "A Community-Aware Search Engine," The Thirteenth International World Wide Web Conference, May 17-22, 2004, New York, NY, 9 pages.

* cited by examiner

*Primary Examiner*—Wilson Lee
*Assistant Examiner*—Hung Tran Vy
(74) *Attorney, Agent, or Firm*—Hickman Palermo Truong & Becker LLP

(57) ABSTRACT

In a search processing system, identifying input authority weights for a plurality of pages, wherein an input authority weight represents a user's weight of a page in terms of interest; distributing a page's input authority weight over one or more pages that are linked in a graph to the page; and using a resulting authority weight for a page in effecting a search result list. The search result list might comprise one or more of reordering search hits and highlighting search hits.

14 Claims, 4 Drawing Sheets

$p$ = BCP $(b, w, \alpha)$ <u>Bookmark-Coloring Process</u>
*Input:* A bookmark $b$, a promotional amount $w$, a retention coefficient $\alpha$.
*Output:* BCV $p$.
$p = 0$
$p_b$ += $\alpha \cdot w$ if ( *stopping criterion is met*) stop
for all links $b \rightarrow j$ in $L$
    $p = p$ + BCP $(j, (1 - \delta) \cdot w /\deg(b), \alpha)$
end for

FIG. 4

$p$ = BCP $(b, \alpha, e)$ <u>Bookmark-Coloring Process</u>
*Input:* A bookmark $b$, a retention coefficient $\alpha$, and a tolerance threshold $e$.
*Output:* BCV $p$.
Initialize $Q$ as a single pair queue $\{(b,1)\}$
$p = 0$
while ( $Q$ is not empty )
    pop a queue $Q$ element $(i, w)$
    $p_i$ += $\alpha \cdot w$                                  // retained portion
    if ( $w < e$ )                        // stopping criterion
        continue                // to beginning of while-loop
    $z = (1 - \alpha) \cdot w / \deg(i)$     // distributed amount
    for all links $i$   $j$ in $L$     // $i$ is fixed: direct link access
        if ( pair $(j, s)$ is present in $Q$ )   // direct $Q$ access
            $s$ += $z$                  // existent element update
        else                          // no $j$ element in the queue
            add a new pair$(j, z)$ to $Q$   // new queue element
    end for
end while

FIG. 5

$[v, s]$ = BC $(b, w, \alpha | H)$ <u>H-Relative Conceptual Bookmark-Coloring Process</u>
*Input:* A bookmark $b \notin H$, an amount $w$, a coefficient, and a hub $H$.
*Output:* $H$-relative BCV $v$ and blocked $s$.
$v = 0, s = 0$
if ($b \in H$)
    $s_b$ += $w$
else
    $p_b$ += $\alpha \cdot w$ if ( *stopping criterion is met*) stop
    for all links $b$   $j$ in $L$
        $[v, s] = [v, s]$ + BCP $(j, (1 - \alpha) \cdot w /\deg(b), \alpha | H)$
    end for
end else

FIG. 6

COMPUTATION OF PAGE AUTHORITY WEIGHTS USING PERSONALIZED BOOKMARKS

BACKGROUND OF THE INVENTION

The present invention relates generally to network and Internet search systems and more particularly to search systems that provide enhanced search functionality for ranking and enhancements based on user personalization.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links (in the case of searching the web), documents, and/or references (in the case of a different search corpus) related to the query. The links returned may be closely related, or they may be completely unrelated, to what the user was actually looking for. The relevance of results to the query may be in part a function of the actual query entered as well as the robustness of the search system (underlying collection system) used. Relevance might be subjectively determined by a user or objectively determined by what a user might have been looking for.

Queries that users enter are typically made up of one or more words. For example, "hawaii" is a query, so is "new york city", and so is "new york city law enforcement". As such, queries as a whole are not integral to the human brain. In other words, human beings do not naturally think in terms of queries. They are an artificial construct imposed, in part, by the need to query search engines or look up library catalogs. Human beings do not naturally think in terms of just single words either. What human beings think in terms of are natural concepts. For example, "hawaii" and "new york city" are vastly different queries in terms of length as measured by number of words but for a human being they share one important characteristic: they are each made up of one concept. In contrast, a person regards the query "new york city law enforcement" as fundamentally different because it is made up of two distinct concepts: "new york city" and "law enforcement".

Human beings also think in terms of logical relationships between concepts. For example, "law enforcement" and "police" are related concepts since the police are an important agency of law enforcement; a user who types in one of these concepts may be interested in sites related to the other concept even if those sites do not contain the particular word or phrase the user happened to type. As a result of such thinking patterns, human beings by nature build queries by entering one or more natural concepts, not simply a variably long sequence of single words, and the query generally does not include all of the related concepts that the user might be aware of. Also, the user intent is not necessarily reflected in individual words of the query. For instance, "law enforcement" is one concept, while the separate words "law" and "enforcement" do not individually convey the same user intent as the words combined.

Current technologies at any of the major search providers, e.g., MSN, Google or any other major search engine site, do not understand queries the same way that human beings create them. For instance, existing search engines generally search for the exact words or phrases the user entered, not for the underlying natural concepts or related concepts the user actually had in mind. This is perhaps the most important reason that prevents search providers from identifying a user's intent and providing optimal search results and content.

A search might proceed as follows: a searcher presents a query (e.g., "new york police") to a search engine and the search engine returns a set of hits (e.g., results, pages, documents, items, etc.) that contain terms of a query (or otherwise "match" the query). The matching process involves (a) extracting an as full as possible set of matching hits and (b) presenting top relevant hits of the extracted set (as the whole set can be very large and therefore unsuitable for presentation), i.e., ranking the hits.

Where the search results comprise a small number of items, all of the items can be presented to the user in any particular order and be considered as relevant as some other order. However, where the search results initially comprise a large number of pages, ranking, filtering and other prioritization might be called for in order that the top (highest) ranked pages be more relevant to the user intent than those that have low rank. In a specific implementation of such search results processing, pages are ranked and presented to the user in rank order from highest ranked to lowest rank, with a cut off after a certain number of hits or below a certain rank value.

Some methods exist for the ranking process, but often this is a computation-intensive process. Some approaches assign ranking values to each hit and sorts the hits by ranking value. Even within this subset of approaches, there have been proposed different methods of assigning ranking values. One approach, wherein each hit comprises a piece of content such as a Web page, is to develop "authority" values for pages, wherein a page's authority value reflects a calculated authoritativeness of the page.

With the authority values in hand, a search engine can optimize search results by ranking hits comprising the search results to better match top pages to likely user intent, e.g., relevancy. In general, a search begins with a search input such as a query string, a URL, search fields, etc., possibly also including context and/or preferences. In response to a user's search input, a search server returns search results comprising items located within the search corpus deemed to be suitable search results given the user intent for the search inferred from the search input.

Authority values for a page might be determined based on the authorities of other pages that point to that page. Pointing is often done using hyperlinks. Thus, if a highly authoritative page includes a hyperlink to a second page, that second page will increase in authority as a result. Computation of authority values using information contained in hyperlinks that connect Web pages to another pages is described in U.S. Pat. No. 6,285,999.

With authority value ranking, the ranking is determined by the pages and their links. In network terminology, these are the nodes and edges, respectively. Where a collection of items can be represented by a graph, as a collection of hyperlinked pages can, an authority vector might represent the set of authority values for a vertex of the graph.

One such type of authority vector is the page ranking vector ("PRV" herein), which is defined over a directed graph, W, of web pages such that a vector component PRV(p) represents the authority induced on a web page p by hyperlink information.

With a typical PRV computation process ("PRV process") is an iterative process wherein the authority of each page might be uniformly transferred along its out links such that authority of a page might be equal to a sum of authorities of pages that point to it. In other words, the PRV process uses a distribution of authority weight balanced with respect to link transitions. Mathematically, this is a stationary point of a stochastic transition matrix. Let $E=E(W)$ be an edge indicator or an adjacency matrix for a graph W, wherein $E_{ij}=1$ in the matrix E if there is a link $i \rightarrow j$ between page i and page j and $E_{ij}=0$ if there is not a link. Where n pages are being considered, $\dim(E)=n \times n$ and $n=|W|$. The stochastic transition matrix P is defined as shown in Equation 1, where deg(i) is the "out degree" of a node i (In the case of Web pages, this is the number of hyperlinks in the page at node i). Given an authority vector $p=(p_1, p_2, \ldots)$, a transformed vector $p'=(p_1, p_2, \ldots)$ can be defined as a result of a vector-matrix multiplication shown in Equation 2.

$$P_{ij}=E_{ij}/deg(i) \qquad \text{(Equ. 1)}$$

$$p'_j = \sum_{i \rightarrow j} p_i / deg(i) = \sum_i p_i P_{ij} \qquad \text{(Equ. 2)}$$

In the PRV process, a PRV authority vector is a probability distribution over W that is a fixed point of the P. This means an authority vector is balanced—it is invariant under the transformation shown by Equation 2. Such authority vector p is a solution of the eigensystem shown in Equation 3.

$$p=P^T \cdot p \qquad \text{(Equ. 3)}$$

Under the conditions of strict connectivity and aperiodicity of the graph W, the Perron-Frobenius theorem guarantees that the simple power iteration process shown in Equation 4 converges to an eigenvector p of Equation 3 corresponding to a simple principle eigenvalue of a matrix P. Since the matrix is stochastic (i.e., its rows sum to one), eigenvector p corresponds to a unit eigenvalue found by the simple power iterative method illustrated in Equation 4.

$$p^{(k+1)}=P^T p^{(k)}. \qquad \text{(Equ. 4)}$$

Dangling pages (defined as pages with deg(i)=0) present a clear problem for the definition in Equation 2, as a dangling page will result in a zero denominator in that equation. Matrix P is sometimes modified as shown in Equation 5, where $d_i=1$ if page i is a dangling page and $d_i=0$ otherwise, and where v is some probability distribution.

$$P'=P+d \cdot v^T \qquad \text{(Equ. 5)}$$

Vector v is interpreted as teleportation: instead of propagation along the out links (there are none), authority is instantaneously transported to all pages in proportion defined by v.

While the condition of aperiodicity is guaranteed for a web graph W, the condition of strict connectivity is routinely violated. To achieve strict connectivity, the dangling page adjustment can be generalized by adding some degree of teleportation to all the pages as illustrated by Equation 6. Coefficient c is usually picked around 0.85-0.9. If teleportation vector $v=(1/n, \ldots, 1/n)$ is uniform, strict connectivity is guaranteed.

$$P''=cP'+(1-c)E, \; E_{ij}=v_j, \; E=(1)_{n \times 1} \cdot v^T, \; 0<c<1 \qquad \text{(Equ. 6)}$$

PRV processes frequently assume a "random surfer" model of a surfer browsing along the Web who browses to a page and then, with probability c, uniformly randomly follows one of the out links on that page or with probability $(1-c)$ teleports according to distribution v to a different page.

If N(i,t) is the number of times a random surfer visits page i over time t, according to the Ergodic theorem, the equation $\lim N(i,t)/t=p_i$ is satisfied. This establishes a connection of the random surfer model with Equation 3 defining a PRV as an eigenvector of a modified transition matrix P'' and with the intuitive requirement of balanced authority.

The generalization of an original transition matrix P to P'' defined by Equation 6 is useful beyond the purely technical reason of achieving strict connectivity. For example, if instead of a uniform teleportation v, a distribution that reflects certain preferences is used (such as topical preferences), this leads to a more specific ranking of search results. While usage of non-uniform teleportation v is known, computing ranking for such teleportation was not easy. Teleportation vectors might be concentrated in a single page as illustrated in Equation 7.

$$v=\delta^{(h)}=\{\delta_i^h\} \qquad \text{(Equ. 7)}$$

In the vector-matrix multiplication of Equation 2, an original transition matrix P is sparse, but the modified matrix P'' is no longer sparse. This can be easily fixed by using the original matrix P alone and keeping track of a residual term $\|p\|-\|P^T \cdot p\|$ in $L_1$ norm.

Equation 3 expresses an eigensystem for the basic matrix, while Equation 8 expresses an eigensystem for matrix P''.

$$p=cP^T \cdot p+(1-c)E^T \cdot p \qquad \text{(Equ. 8)}$$

Different methods to accelerate the simple power iteration process shown in Equation 4 have been suggested, including extrapolation methods based on a striking result concerning second eigenvalue and block-structure methods. Typically each of these is an iterative method that engages in a kind of iterative approximation to p starting from some initial guess.

Ideally, iterative processes should converge. Different ways to estimate convergence of the iterative process exist (e.g., $L_1$ norm or Kendall's $\tau$). Since $E \cdot p = v$ when $\|p\|=\|p\|_1=1, p \geq 0$, the eigensystem illustrated by Equation 8 can be cast as a linear system described by Equation 9.

$$p=cPT \cdot p+(1-c)v \qquad \text{(Equ. 9)}$$

A block-structure methodology can be extended to personalization by assigning some preferences to blocks. More practically, tractable topic-sensitive personalization is suggested in Haveliwala, T. H. *Topic-sensitive PageRank*, Proc. of the Eleventh International World Wide Web Conference (2002). Some information retrieval methodology is required to establish the link between a query and each of the topics. As a result, this approach is effectively limited to a few hundred of precomputed topical PRVs and does not scale well.

Jeh, G., Widom, J., *Scaling Personalized Web Search*, Technical Report, Computer Science Department, Stanford University (2002) ("Jeh and Widom") proposed personalization based on page-specific PRVs. Correspondingly, user bookmarks with suitably configured weights naturally induce personalization. Jeh and Widom showed how a small portion of basis PRVs corresponding to hub pages H (important selected pages) facilitates computing of a general PRV at query time. Basis hub PRVs can be compressed (encoded). A so-called Hub skeleton, a relatively small data structure, is instrumental in their decoding. The developed theory is based on technical apparatus related to inverse P-distance and its modifications.

The random surfer model is not the only model for studying ordering of search results. Kleinberg [Kleinberg, J., *Authoritative sources in a hyperlinked environment*, Proceedings of the ACM-SIAM Symposium on Discrete Algorithms (1998) introduced a framework similar to page rank analysis that utilized a small query-specific subgraph of W. Corresponding development resulted in HITS algorithm [see, for example, David Gibson, Jon Kleinberg, Prabhakar Raghavan, Inferring Web Communities from Link Topology, Proceedings of the 9th ACM Conference on Hypertext and Hypermedia, 1998] and its variations [see, for example, S. Chakrabarti, B. E. Dom, R. K. David Gibson, P. Raghavan, S. Rajagopalan, and A. Tomkins. *Spectral filtering for resource discovery.* In Conference on Research and Development in IR (SIGIR'98), Melbourne, Australia, 1998].

While a number of these approaches might be useful in some ordering tasks or some number of users, they are limited in some ways, not scalable in some situations, require excessive computing power, are not specific enough, or have other shortcomings. Thus, there is a need for improved search systems that can improve upon the search experience in providing search results to a querier.

BRIEF SUMMARY OF THE INVENTION

Embodiments of the present invention provide novel search result handling methods and apparatus. Search result handling includes, but is not limited to, reordering search hits, highlighting search hits, or other methods of directing the user to intended results and away from unintended results.

In one approach, authority vectors are determined over the graph of Web pages utilizing the graph's hyperlink structure and a coloring process including variations to overcome previous limitations. A bookmark-coloring process ("BCP") can be used with the graph's hyperlink structure to compute a set of bookmark-coloring vectors (BCVs) comprising BCVs for pages or other network node items. The BCV set can be used for ranking search results by ranking hits based on their BCVs. BCVs can be computed quickly and the BCP can use hyperlink (connectivity) information more efficiently.

In many implementations, the BCV set is quite sparse, which is useful in some applications, since it (or a portion thereof) can be fetched into memory faster and occupy less space. A BCV set can be used for personalization of web search results. In a specific embodiment, a BCV set is associated with a subset of important pages, called a hub. When a hub subset of a total web graph is selected, hub specific basis BCVs can be used to compute a general BCV set, and the BVC set can be optimized both in terms of computing and size.

The following detailed description together with the accompanying drawings will provide a better understanding of the nature and advantages of the present invention.

BRIEF DESCRIPTION OF THE DRAWINGS

FIG. 4 shows pseudocode illustrating a process for conceptual bookmark coloring.

FIG. 5 shows pseudocode illustrating a process for conceptual bookmark coloring.

FIG. 6 shows pseudocode illustrating a process for conceptual bookmark coloring.

DETAILED DESCRIPTION OF THE INVENTION

Overview

Figure 1:
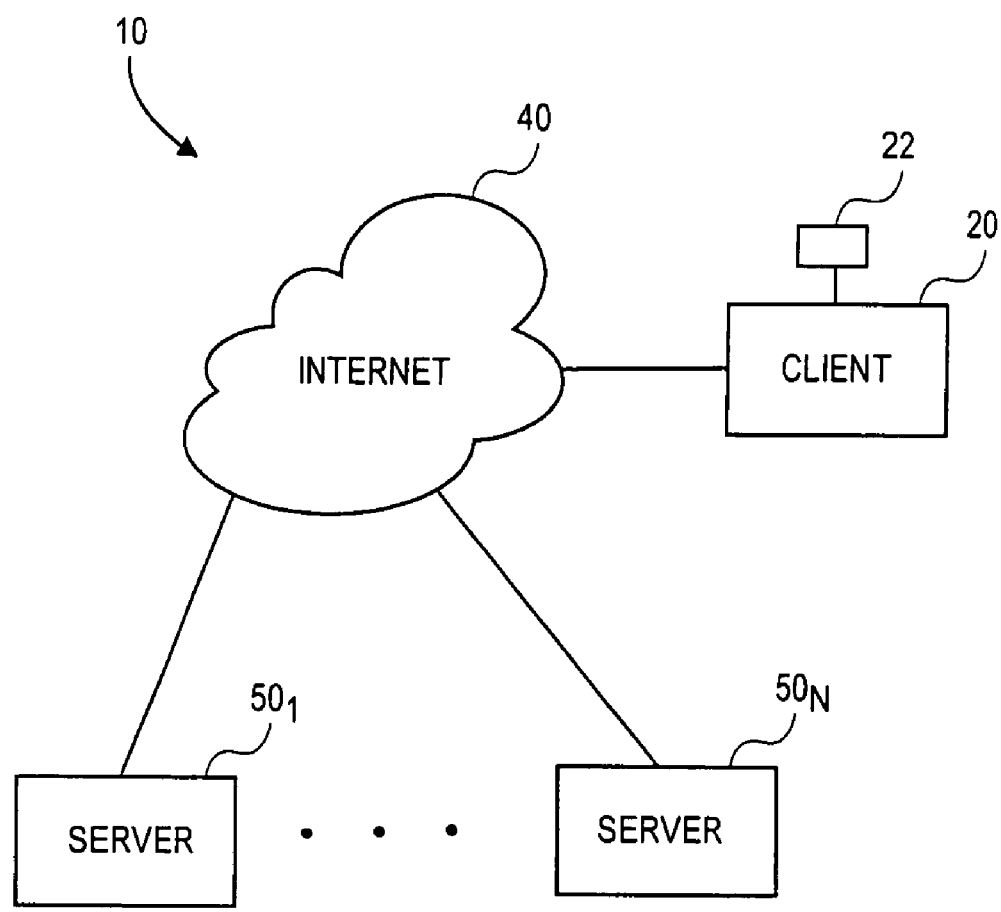
FIG. 1 is a simplified high-level block diagram of an information retrieval and communication system according to an embodiment of the present invention.

"Coloring" of a graph is a term used to describe any number of processes for assigning weights to nodes in the graph by allocating a quantity (or multiple quantities) to a node and having some of that quantity or quantities propagate to other nodes connected to the allocated node. The name might derive from the idea that pouring a quantity of colored paint on one node would cause the node and its neighbors to be colored to varying degrees.

In the examples here, coloring results in nodes being assigned values indicative of their weight for certain operations. In the example of searching a corpus of documents linked as in a graph where each document is a node in the graph, coloring might be used to weight pages for the purposes of ranking search results. For example, users might present queries to a querying system that performs a search of a corpus for documents or other items that are deemed to satisfy the search (i.e., search "hits") and a weight associated a hit might be indicative of how interested in the particular user is expected to be in that hit. Coloring methods can be used to "paint" indications of interest on a graph representing a web of documents. When the weights are aggregated, each hit that is so evaluated would have an associated authority value (or weight) representative of the authority the user might associate with a page represented by the hit.

An analog to determining authority weights to nodes of a graph is in determining relative importance of airports for a particular traveler or travelers in the aggregate.

Consider a graph of air traffic for world travel, which airports as nodes linked by edges representing flights. Such a graph would be similar to a directed graph, W, representing a hyperlinked web of documents such as the World Wide Web. Weights for how important an airport is to an individual traveler orchard travelers in the aggregate might be measured by an amount of the money passing through that airport.

As an example of a simulation, assume each traveler spends α fraction of his or her money currently available in each airport, having less and less money as the trip progresses. Assume the traveler begins travel at node b corresponding to Houston, Tex. Obviously, many passengers go to Atlanta, Chicago and New York. Due to vacation destinations and business affiliations, some traffic lands in Hawaii, Düsseldorf, and oil producing countries. However, very few people confidently go from Houston to Ukraine, Ceylon, or Tibet. From a business standpoint, such rare destinations do not matter. They do matter, however, for traffic originating in Moscow, Bombay, or Beijing.

To find how much money is spent on average at different nodes, authority values can be determined through a process performed assuming a random walk (and teleportation to Houston) until O'Hara or JFK magnitudes sufficiently converge. Unfortunately, these two important nodes are treated equally by the typical analysis process relative to any landing field in Ukraine, Ceylon or Tibet. However, with a coloring approach such as one described herein, spending funds flow with the traffic, possibly having a cutoff threshold as a stopping criterion. This allows for not propagating beyond more or less significant destinations. Thus, the solution is sparse, and in either case, the result is computed much more efficiently.

In addition, before a less significant node, such as the Düsseldorf node, is processed, two important airport nodes of Munich and Frankfurt in Germany would be most probably touched. Both direct some traffic to Düsseldorf and so handling of a propagation from here can be delayed to reflect both Munich and Frankfurt components. This accounts for additional savings in computation efforts, and allows for super positioning of results, such as pre-computed values and custom values.

Additional computation can be saved through the use of the "hub" concept. Munich and Frankfurt are hubs in Germany and Heathrow is a hub in the UK. In thinking about traffic from Houston, it would be very useful to know in advance traffic distributions corresponding to hubs, since these are the airports where most people do their connections. Thus, instead of gradual propagation from each reached node, known hub distributions can be reused when a hub is reached. Such "modulo hubs" computation is described herein as "H-relative BC" processing.

Further gains in computational efficiency can be had by simplifying the process of referencing all hub distributions, R. To this end, a simplification can be done wherein most traffic is recognized as going between the hubs, with a relatively small remainder spilling over more or less locally. Thus, a hub skeleton can be created that allows hub calculations to determine hub distributions represented by a very sparse spillover and within the hub distribution.

A Network Implementation

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

Search System

Figure 2:
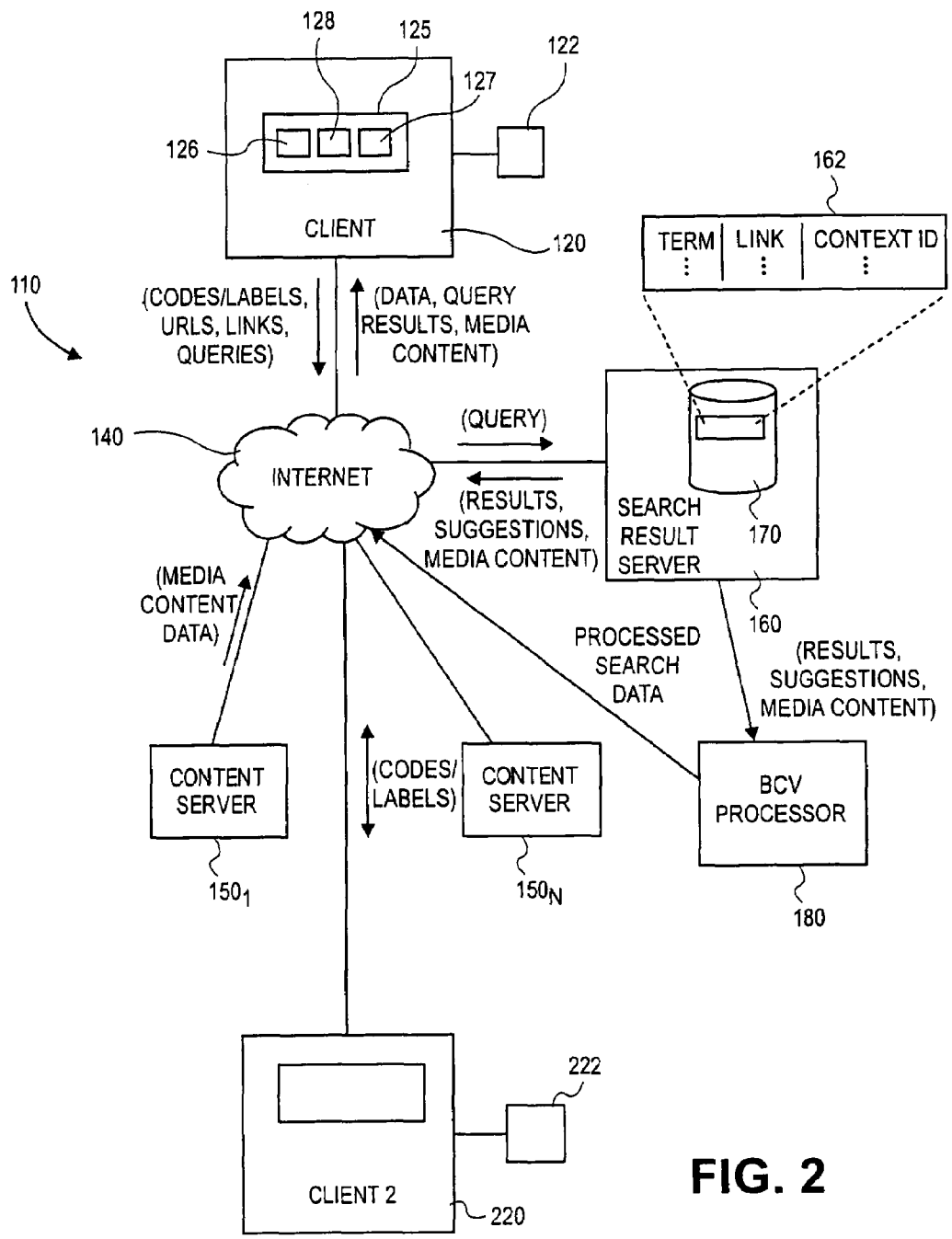
FIG. 2 is a simplified block diagram of an information retrieval and communication network for communicating media content according to an embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

1. Client System

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with according to aspects of the present invention include various e-mail applications, instant messaging (IM) applications, browser applications, document management applications and others. Further, interface module 127 may include a browser, such as a default browser configured on client system 120 or a different browser.

2. Search Server System

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content. Search server system 160 is also preferably configured to record user query activity in the form of query log files described below.

Search server system 160 in one embodiment references various page indexes 170 that are populated with, e.g., pages, links to pages, data representing the content of indexed pages, etc. Page indexes may be generated by various collection technologies including automatic web crawlers, spiders, etc., as well as manual or semi-automatic classification algorithms and interfaces for classifying and ranking web pages within a hierarchical structure. These technologies may be implemented on search server system 160 or in a separate system (not shown) that generates a page index 170 and makes it available to search server system 160.

An entry 162 in page index 170 includes a search term, a link (or other encoded identifier) to a page in which that term appears and a context identifier for the page. The context identifier may be used for grouping similar results for search terms that may have different meanings in different contexts. For example, the search term "java" may refer to the Java computer language, to the Indonesian island of Java, or to coffee (which is often colloquially referred to as java). The context identifier for a page advantageously indicates which of these contexts is applicable. A page link may be associated with multiple context identifiers, so the same page (or a link thereto) may be displayed in multiple contexts. Context identifiers are preferably automatically associated with page links by the system as users perform related searches; however, the identifiers may also be modified and associated with links manually by a team of one or more index editors. In this manner, knowledge gleaned from numerous searches can be fed back into the system to define and re-define contexts to make the displayed search results more valuable and useful to the requesting user.

Search server system 160 is configured to provide data responsive to various search requests received from a client system, in particular from search module 126. For example, search server system 160 may be configured with search related algorithms for processing and ranking web pages relative to a given query (e.g., based on a combination of logical relevance, as measured by patterns of occurrence of the search terms in the query; context identifiers; page sponsorship; etc.).

BCV Processor

As shown in FIG. 2, search server system 160 provides its output (results, suggestions, media content, etc.) to a BCV processor 180 that returns the output with weighting information such as authority values for each item in the output.

Figure 3:
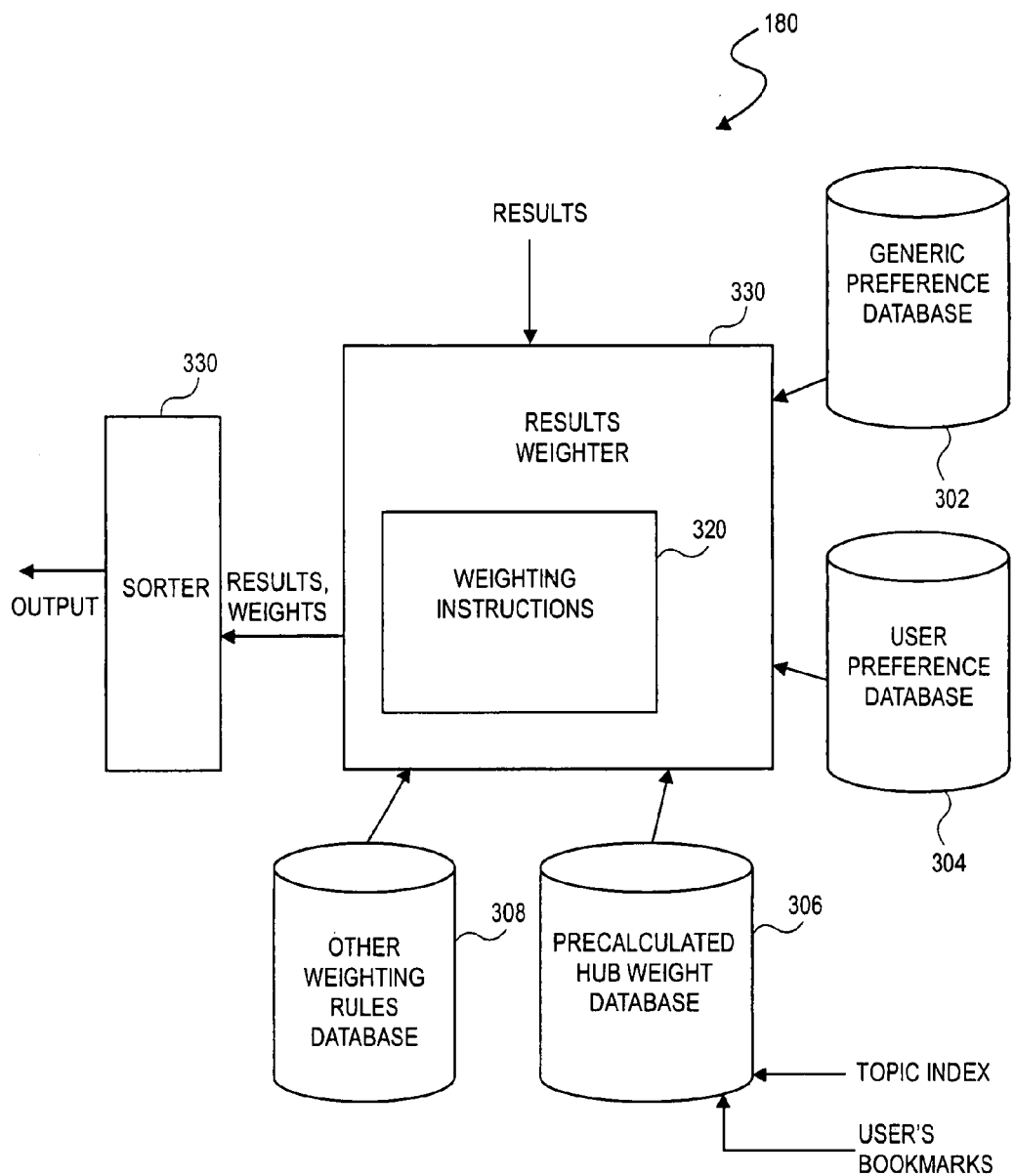
FIG. 3 is a simplified block diagram of a BCV processor for generating BVC sets according to an embodiment of the present invention.

FIG. 3 illustrates one embodiment of BCV processor 180 in greater detail. As shown there, results or other output are received by the results weighter 300. Results weighter 300 can use information contained in any generic preference database 302, a user preference database 304, precalculated hub weight data 306, additional weighting rules from rule base 308 and possibly other sources. Using those inputs and according to weighting instructions 320, results weighter 320 outputs the results or other search server system outputs to a sorter 330 along with weightings for the output. Sorter 330 can then reorder such output according to their weights and that can be provided (by a system as shown in FIG. 2) to a client having requested a search. A number of a different sets of weighting instructions will now be described. It should be understood that combinations of these different sets and/or variations thereof could be used instead of exactly what is described herein and a person of ordinary skill in the art would understand how to modify these teachings to cover additional variations. The weights can be used to order search hits, determine where to crawl for more material, or otherwise influence the search process.

In general, connectivity among items in a search corpus can be used in a coloring model. In the examples herein, the search corpus is a collection of hyperlinked documents and connectivity is indicated by links between documents. However it should be understood that these teachings might be used with other variations.

With a coloring model model, a "coloring substance" is diffused across the graph. A certain fraction, $\alpha$, of substance incoming to a current vertex stays with the vertex, while the rest flows to other vertices along "out" links. Intensity of the color can be used to represent a vertex's "authority" for ranking or other purpose. The process can be initiated with a fixed vertex that is a bookmark, thus the term "bookmark coloring". Such a process might determine a set of authority values referred to as a bookmark coloring vector (BCV) for the graph and particular inputs. A BCV is often an efficient and sparse data structure that leads to ordering of search results similar to page rank analysis, but with much less computation and storage. BCV processing can also be used for personalization based on a subset of hub page-specific precomputed BCVs.

The Bookmark-Coloring Model section below describes an introduced model and ways to compute BC values. The H-Relative Bookmark-Coloring section below describes a more efficient way of finding general BC values when a set of hub page-specific BCVs are precomputed. The Efficient Computing of Hub Basis BCVs section below describes some ways of simultaneous computing and encoding the set of hub page-specific BCVs. The Loop Factor section below describes other useful improvements in the process dealing with loops in the graphs. The Application to Personalization section below describes how BCVs might be applied to personalization of Web searches.

Bookmark-Coloring Model

In this section, bookmark-coloring models are described along with generalizations, BCV computing and comparison to conventional page ranking analysis. In a bookmark-coloring model, the process can be represented with expressions as follows. It should be understood that in a practical embodiment, processing would require some computing apparatus such as a general purpose computer programmed to perform the analysis.

One input to a bookmark-coloring process ("BCP") is a graph representing a set of hyperlinked pages, a social network, or other network structure generally having nodes and edges. With the graph, graph vertices represent the nodes of the network. In the case of web pages, edges are directed as "out" links from a linking page to a linked page. A BCP determine authority weights for some or all vertices of the graph.

An authority weight for a node calculated using a BCP is referred to herein as a bookmark-coloring ("BC") value and the BC values for a set of nodes/pages can be represented by a bookmark-coloring vector ("BCV"). A given graph can have more than one possible BCV, as the BC process can have different inputs for the same graph. Under certain limited conditions, the authority weights of a BCV calculated using a BCP might coincide, or be proportional to, the authority weights of a page rank vector ("PRV") calculated using a page ranking process, but the use of BCP can be expected to provide better results and/or results with less computational effort.

Inputs to a BCP might include a graph, a set of nodes for initial color loading (which are "bookmarks" in many examples herein), viscosity parameters (indicating how much "color" sticks and how much is passed on), propagation thresholds, and other parameters. Outputs of a BCP include a BCV. BCVs can be further processed, such as by being compressed or superimposed with other BCVs.

Starting with some node b, a fraction α of a coloring substance that gets to node b is retained and a fraction (1−α) is distributed uniformly along the out links from node b. Let $p^{(b)}$ represent a bookmark-coloring vector ("BCV") corresponding to a starting node b (with unit starting amount) and a "viscosity" of α (i.e., 2 retention coefficient). Mathematically, the model is as shown in Equation 10.

$$p^{(b)} = \alpha \delta^{(b)} + (1-\alpha) \sum_j p^{(j)} / deg(b),\quad \text{(Equ. 10)}$$

where $b \to j \in L$.

Conceptually, the bookmark-coloring process suggested by (Equation 10) can be implemented by a program according to FIG. 4, with w=1: p=BCP (b, α) and BCP (b, α)=BC (b, 1, α). The recursion over all links from b to j can be cut off when the color amount becomes so small that its further distribution is infeasible or not likely to significantly affect the results.

As a result of truncation of recursion, considerable computing effort can be saved, although some color amount is lost when color amount to be propagated from a node fells below threshold, or when a dangling page (i.e., a page with no out links) is encountered. However, such loss does not typically affect ranking and, unlike in the iterative computing of page ranking analysis, no renormalization is needed.

One observation that might need to be dealt with is that the process of FIG. 4 may require a very deep stack because of the recursion. To deal with that, a variation might be used. An additional advantage of this variation is that it deals with cases where different nodes engage the same node at different places in the travel of the process.

Since a node handles color amount from multiple sources uniformly, a good strategy is to wait until several color amounts reach a node and then process them. For this, a "queue" of requested transactions is provided with each transaction corresponding to a pair of a node j and a color amount w still to be distributed from this node along its out links. A data structure Q is a queue preferably with direct access. Elements of Q are pairs (j, w). "Direct access" refers to arrangements allowing for quick location of a pair by its key j, such as, for example, through the use of an index.

FIG. 5 illustrates a process corresponding to the variation of a BCP using a queue. Further variations of the above-described analysis processes might work as well or better. For example, an approach coupling a FIFO heuristic (such as to perform a pop operation on a queue) with a "largest w goes first" strategy might work well. To implement this variation, reshuffling of a queue might be done in a manner similar, but not limited, to sorting. By selecting the largest (or at least large enough) w to process, more balanced queues are built and most of the coloring substance being propagated is removed sooner rather than later, which speeds up convergence.

Other Variations

While the above BC processes are shown dealing with single page-specific initial impacts, variations might use several bookmarks b with different initial amounts to initiate the same or similar outcomes. These can be accomplished by changing the initialization of the queue Q in FIG. 5 with a few pairs, one per bookmark. To personalize the search for a particular user, several bookmarks and associated weights (both specific to a user) might be used to construct a single BCV and that can be done through selection of the initial set b. This observation reflects linearity of the model.

Another possible generalization relates to a bookmark-coloring model itself. While uniform propagation along all out links is cheap, assigning to links some weights reflecting their quality is desirable (e.g., anchor text related relevance). This allows for different out links to be weighted differently based on their different characteristics. In page rank analyses, practical implementation of nonuniform weighting is very computationally expensive. In some cases, a more expensive treatment of links can be done for a small number of large w, while the remaining majority of small w can be handled using uniform treatment.

In some variations, site internal links and site external links can be handled in a distinct manner (such as by using different weights) to avoid manipulation of a BC ranking. As an example, a site operator seeking to enhance the BC values for its pages might modify the out links of each page such that they point to pages within the site and those point to pages within the site, and so on to ensure that when color applied to a page within the site propagates, it propagates only to other pages of that site. With this variation, site internal links are underweighted or skipped over so that coloring is fairly distributed.

Similarity of Outcomes

For many sets of search results, the hits of the search results might have the same or similar authority values whether a page ranking process is used or a bookmark-coloring process is used, even though the processes start with different random surfer and bookmark-coloring models, and result from two distinct computational processes.

To explain, let $y_i$ be the total color amount that passes through a node i. According to a BC model, an α fraction $p_i = \alpha y_i$ is retained by a node, the rest being distributed. Value $y_i$ comprises two components: (1) the original unit impulse $\delta^{(b)}$ of color, and (2) an amount that reaches node j in the result of propagation. Thus, the value can be expressed as shown in Equation 11. Multiplying by α results in Equation 12, which in vector form as is shown in Equation 13.

$$y_j = \delta_j^{(b)} + (1-\alpha) \sum_{i \to j \in L} y_i / deg(i) \qquad \text{(Equ. 11)}$$

$$p_j = \alpha \delta_j^{(b)} + (1-\alpha) \sum_{i \to j \in L} p_i / deg(i) \qquad \text{(Equ. 12)}$$

$$p = \alpha \cdot \delta^{(b)} + (1-\alpha) \cdot P^T \cdot p \qquad \text{(Equ. 13)}$$

Note that Equation 13 corresponds with Equation 9 for a page ranking vector for a page-specific teleportation $v = \delta^{(b)}$ and $c = (1-\alpha)$. Mathematically speaking, the outcomes might be similar, at least in absence of dangling pages and under assumption that all computations are performed to infinite precision, but in practice the bookmark-coloring process can be done with much less computation. In other words, a BCP with a page-specific teleportation vector of $v = \delta^{(b)}$ serving as a initial impulse is a much more focused analysis than page ranking analysis, which equally treats all the nodes and spends most of the time on irrelevant nodes. In comparison, a BCP uses local propagation and therefore is "connectivity sensitive".

Some experiments show that existent pair updates happen approximately five times more frequently than adding a new pair. This delayed handling results in a significant saving having no analog in iterative page ranking analysis. For this and other reasons, computing of a bookmark-coloring vector is significantly faster than comparable computing of a page-specific page ranking vector.

Sparseness

BCV approximation has another interesting property: it is sparse. After several iterations (equal to a modest W graph diameter), a page-specific page ranking vector for a page b might become non-zero on any page reachable from page b. A bookmark-coloring vector tends to preserve its sparsity as affected pages are grouped around the initial page b and BCP activity grows the vicinity of b adaptively—propagation does not penetrate beyond the threshold-imposed barrier when one is present.

While the use of a barrier may mean that a vector is only appropriate for ordering part of a result set, relatively low magnitudes of whatever authority vector are less reliable in an ordering process and in real applications an authority vector is only one of many components used by the ranking process. Sparsity is very beneficial for maintenance and personalization, since encoded sparse objects can be accessed faster.

H-Relative Bookmark-Coloring Analysis

Assume that a subset of important pages $H \subset W$ in W (having, for example, high uniform authorities) called a hub is selected, and that $N = |H|$ different basis $r^{(h)} = BCP(h, \alpha)$ vectors for $h \in H$ are computed. This set of known basis $r^{(h)}$ vectors can be leveraged for computing, for a page b, a vector $p^{(b)} = BCP(b, \alpha)$ when $b \notin H$. With such leverage, an application could personalize using any bookmark inside H or outside H and avoid a need of using other technologies to provide coefficients for hub pages. While basis hub BCVs are pre-computed, usage of a bookmark outside H requires online computing of corresponding BCV. A way to do this efficiently is described below. This superimposition is useful.

A topic-sensitive search approach can use, for example, Information Retrieval correlations to construct coefficients for a couple of hundreds of topic-specific PRVs. When a bookmark is outside the hub set H, an efficient way shown below can be used to find a projection of its BCV p on hub basis BCVs, effectively approximating p by a linear combination of basis BCVs. A projection of a BCV p on basis vectors might be constructed as illustrated in Equation 14.

$$p = s_1 \cdot r^{(1)} + \ldots + s_N \cdot r^{(N)} + v \qquad \text{(Equ. 14)}$$

In that equation, p is a linear combination of BCVs for N pages in H (a projection) corrected by v. Coefficients s and correction v are determined from p. If their computing is easier than computing the original p, precomputed basis vectors $r^{(h)}$ can be said to have been successfully leveraged. While super position is normally expected to be linear, other combination nodes might also be available such that pre-computation reduces the amount of processing needed.

With this in mind, a modification of a BCP called H-relative bookmark-coloring processing ("H-relative BCP") will now be described. H-BCP regards H as a blocking subset. If a color propagation process hits a page outside H, H-relative BCP treats it as described above. If, on the other hand, color reaches $h \in H$, its amount $w_h$ is fully retained by h with no further propagation. The result of so blocked propagation can be split into two terms. The first one, v, is the result over non-hub pages W\H extended to H by zeroes. That is referred to as H-relative BCV, $v_{|H} = 0$. The second one, $s = \{s_h, h \in H\}$, is the color blocked by H.

H-relative BCP is a sort of modulo H (or mod H) computing process, with a conditional probability notation such as, (given hub H, or |H), BCP(b, α) mod H=BCP(b, α|H). Referring to FIG. 6, BCP (b, α|H)=BC (b, 1, α|H), where [v, s]=BC (b, w, α|H). FIG. 6 illustrates a process for H-relative BCP.

Because of blocking, vector v is sparser than p: if any path from b to j crosses H, then $v_j$ is zero, while $p_j$ is not. Moreover, a larger H results in a sparser v. As a result, this process is very scalable. The blocked version is also significantly faster: in real Q-implementation, queue Q is not filled whenever a blocking page h is encountered.

Efficient Computing of Hub Basis BCVs

Any BCV can be obtained from its H-relative version and a set of precomputed bookmark specific vectors $r^{(h)}$ as is shown here. Assume that [v, s]=BCP (b, α|H). Then p=BCP (b, α) is equal to $p_i$ as shown in Equation 15.

$$p_i = v_i + \sum_{h \in H} r_i^{(h)} \cdot s_h \qquad \text{(Equ. 15)}$$

Therefore, precomputed $r^{(h)}$ can be used to get p from fast and sparse H-relative BCP results. Both v and s are linear in p. This is because each $h \in H$ knows how to distribute its color—this is what the $r^{(h)}$ are for. Therefore, all that is needed to know is how much color gets to each h in H (this is s) and where color that has not hit H on its way landed (this is v). Equation 15 can be expressed in a vector form shown in Equation 16 where matrix R has columns that are hub h-specific BCVs with $\dim(R) = n \times N$ and where v is zero on H and is sparser than p, $\dim(v) = n$, and $\dim(s) = N$.

$$p = v + R \cdot s, \ R = (r_i^{(h)}, i=0:n-1, h \in H) \qquad \text{(Equ. 16)}$$

In practice, terms with $s_h$ below certain threshold η can be skipped. Potentially H-relative vectors can be computed at query time with low accuracy, but that should be sufficient in many applications.

The previous section describes how knowledge of basis BCVs $r^{(h)}$ vectors for $h \in H$ can be used for effectively computing $p^{(b)}$ for $b \notin H$. Equation 16 assumes that matrix R, whose columns are full basis BCVs, is available. Another reason to have R is just to use linear combinations of its columns with some coefficients that are supplied by additional informational sources (e.g., finding "topical" coefficients).

Effective computing and maintenance of matrix R presents challenges, such as computing many basis BCVs $r^{(h)}$, is computationally difficult and fetching basis vectors $r^{(h)}$ in memory generates huge I/O costs. Some improvements can help. Computation of a set of N basis vectors $r^{(h)}$ can be shortened and simultaneously compressed. This compressed form can be encoded and accessed during I/O stages. In exchange for effective computing and encoding, one matrix multiplication by a N×N matrix is added to the effort.

Let $R=(r_i^{(h)})$, i=0:n−1, $h \in H$ denote a matrix of basis BCVs $r^{(h)}$. It has dimensions n×N, n=|W|, N=|H|. Before this, the system assumed that $b \notin H$. If $b \in H$, H-relative BCP stops right away with v=0, $s=\delta^{(b)}$. This is a trivial result saying that to compute $r^{(h)}$ it must be known to the system. Consider a simple generalization of H-relative propagation model: at the first propagation step from b=h retain a of the initial w=1 assigning it to h component of $r^{(h)}$ and distribute the rest 1−α over out links. From this moment on, revert to regular H-relative BCP: w propagates over nodes outside H or get blocked by nodes within H. Considering this, Equation 17 can be used in place of Equation 15.

$$r_i^{(b)} = \alpha \delta_i^{(b)} v_i^{(b)} + \sum_{h \in H} r_i^{(h)} \cdot s_h^{(b)} \quad \text{(Equ. 17)}$$

In this formula, the δ term describes a very first step impact, v is a relative partial vector equal to zero over H, and s are blocked weights. Here, b and h vary over the H, while i varies over all W. For each b, Equation 17 goes over one column of R. Equation 18 is a generalization of Equation 15.

$$R = \alpha I_{n \times N} + V + R \cdot S \quad \text{(Equ. 18)}$$

In Equation 18, R=R(H) is a matrix of basis BCVs with dim(R)=n×N, V=V(H) is an H-relative version of R with dim(V)=n×N and V is zero on rows i in H, and S=S(H) is a blocked component of H-relative BCP with dim (S)=N×N.

Note that V is much sparser than original R and can reside on disk in an encoded and/or compressed form. Also, computing H-relative [V, S] is faster than computing a full R, as is the case with H-relative computing. Equation 18 and a program or system that operates according to Equation 18 relates three matrices that can be solved with respect to R. This provides a way to restore R from cheap and encoded objects. Since Equation 18 implies Equation 19, this reduces to Equation 20 where $K=(I_{N \times N}-S)^{-1}$ is the N×N matrix inverse to a diagonally dominant matrix $(I_{N \times N}-S)$.

$$R \cdot (I_{N \times N} - S) = \alpha I_{n \times N} + V \quad \text{(Equ. 19)}$$

$$R = (\alpha I_{n \times N} + V) \cdot K \quad \text{(Equ. 20)}$$

When matrix S has decreasing powers (as is the case in practice), the result of Equation 21 is obtained.

$$K = I_{N \times N} + S + S^2 + S^3 + \ldots + S^K + \ldots \quad \text{(Equ. 21)}$$

If all that is needed is linear combinations of $r^{(h)}$, no further computation is needed.

The developed apparatus is applicable to a more general non-hub specific BCV p of the previous section corresponding to any $b \notin H$. It can be "decodable" from a "partial" V. Substituting Equation 20 into Equation 16, the result is shown in Equation 22.

$$p = v + R \cdot s = v + (\alpha I_{n \times N} + V) \cdot K \cdot s \quad \text{(Equ. 22)}$$

In other words, instead of fetching in longer columns of R as required by Equation 16, I/O can be limited to much smaller columns of V (stored in encoded form) per Equation 22. Matrix K can be kept in core memory. In addition, computing relative data [V, S] is much faster than computing the original R. These improvements come with the price of extra multiplication by K. Some accuracy can be expected to be lost in the process.

Loop Factor

Additional efficiencies can be obtained using loop factors. Above, potential generalizations (e.g., non-uniform distribution for larger w) were described, along with improvements (e.g., accessing larger pairs in the queue). In this section, a device that further speeds BCV computing is described.

Imagine that during the process of color distribution started at page b, the page b is encountered again. It means that the whole process mirrors itself. It does not go on forever because the process starts with w=1, and potentially hits b again with a much smaller w. Since propagation of w occurs only above certain threshold, the process eventually stops. In practice, especially for a highly connected starting node b, it actually gets a secondary hit.

The process can be sped up by saving on looping by accumulating the entire color amount f that ever returns to b instead of propagating it along the way that generated loops in the first place. Let p represent the vector computed by only propagating the initial color weight (w=1) and holding (not propagating) the color weight f that returns to b. The only input to its b's component is done at the very first step: $p_b = \alpha$. Then $p^{(b)} = p + f \cdot p^{(b)}$ and the result is shown in Equation 23.

$$p^{(b)} = p/(1-f) \quad \text{(Equ. 23)}$$

In practice, an authority vector is used for ranking and so only relative magnitudes are important. However, if the BCVs are normalized (in L1) to be a distribution, the result is as shown in Equation 24.

$$p_b^{(b)} = \alpha/(1-f) \quad \text{(Equ. 24)}$$

This equation allows finding a factor f, or a loop factor. Notice that the rationale to eliminate looping is similar to relevant computing modulo {b} itself. Notice that, by the same token, matrix S in Equation 18 may be done to have zero diagonal.

Dangling pages are dealt with easily with BCP—color amounts that propagate to them are simply discarded. Equations 12-13 always hold for a BCV, but only hold for conventional page ranking when there are no dangling pages. In reality, the modification described by Equation 5 artificially introduces a looping into a page ranking analysis. From a variety of ways to modify the random surfer model to handle dangling pages, that modification is unique in the sense that it provides for equality of ideal PRV and BCV.

Application to Personalization

This section shows how bookmark-coloring vectors lead to a natural search personalization. Different views on search personalization coexist and could be equally useful. One view is that certain "personalizable" queries (e.g., frequent queries having multiple meanings, or potential background information such as "jaguar" or "pizza restaurant") can be treated differently based on a user profile. For example, of different query extensions the one(s) "fitting" a user profile attributes (as preferential topics or location) can be substituted. This approach is good, since it actually tries to utilize user profile. It has its problems as well: (a) it is limited to special queries; (b) it partially intersects with query disambiguation process, (c) it relies on user profile, which is hard to mine, and (d) it can actual shift a focus contrarily to a user desire.

Personalization can be thought of as of a process orthogonal to query disambiguation. In its most pure form, it abandons mining user profile data. Instead, the user explicitly indicates desired preferences in terms of a few selected bookmarks. For example, a query "jaguar" can still result in multiple topics, but be personalized by a geographic location both for cats and dealerships. This location is not extracted from the user profile, but implicitly influenced by bookmarks connectivity information. A URL of a local paper would be an example.

This approach is more flexible with regard to potential attributes, since bookmarks cover many potential preferences. For example, a query with a clearly defined topic, as "free trade", can be personalized not by its extensions, but by political orientation of a requester. A bookmark corresponding to conservative/liberal Web sites can be instrumental in this regard. This pure formulation can be blended with any other approach that results in a "user-specific" set of bookmarks.

Assume some mechanism allows a user to select and maintain a set of bookmarks with associated weights. It could be a direct user interface or some other mapping from topical, user profile, or any other information. As a pure component (an object with API) this approach has several advantages: 1) its core does not require blending with any other technologies (IR, linguistic analysis, or predictive classifiers), but is purely based on W connectivity; 2) it does not access user profile data, or deal with a query, but purely relies on a simple input personalization object—a set of bookmarks with their weights; 3) it allows an effective straightforward UI: the user can nominate some bookmarks (probably emphasizing them with non-negative weights or other measures); and 4) input of bookmarks can be updated instantaneously.

Thus, the results of such personalization are available and can be evaluated online. Resulting coefficients are reusable (they are, so to speak, "personalization cookies"). Two sets of bookmarks can easily interact: corresponding BCVs can be combined linearly.

Consider the following example. Suppose a web graph represents a collection of over one billion pages and a user has hundreds of bookmarks. A BCV can be computed for those inputs and used to order the user's search results. Because of the sparseness condition, the BCV can be expected to be sparse in that all but a few hundred thousand components of the BCV will be zero. Because of linearity (or other superimposability characteristic), BCVs can be precomputed and used to more quickly calculate a user-specific BCV, a set of authority weights.

A set of 10,000 or so popular bookmarks could have BCVs computed therefor and used where each user includes them. Thus, a space of a million users with one hundred bookmarks might have ten thousand bookmarks representing 80% of the space and 20% taken up by less popular bookmarks, which can be processed and combined with precomputed BCVs for the more popular bookmarks.

FURTHER EMBODIMENTS

While the invention has been described with respect to specific embodiments, one skilled in the art will recognize that numerous modifications are possible. For instance, instead of a network of Web pages as nodes and hyperlinks as edges, BCP could be applied to a social network, wherein individuals and/or entities are nodes and the relationships between them are the edges. Resulting data structures, such as BCVs, hub basis BCVs and/or hub skeletons might be stored on a server or a client.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

In some embodiments, BCVs can be calculated to consider topic-specific teleportation.

Thus, although the invention has been described with respect to specific embodiments, it will be appreciated that the invention is intended to cover all modifications and equivalents within the scope of the following claims.

What is claimed is:

1. A computer-implemented method for presenting a set of search results, the method comprising:
assigning, to each page of a set of one or more pages, an authority weight;
wherein the authority weight assigned to each page represents a relative importance of the page relative to other pages;
for each page in the set of pages, recursively distributing the page's authority weight over pages that belong to a collection of pages, thereby establishing authority weights for at least some pages, within the collection, that do not belong to the set of one or more pages;
wherein the step of recursively distributing the page's authority weight includes establishing the page as a current page and repeatedly performing the following steps until an end condition is satisfied:
  a) following an outgoing link from the current page to a next page that belongs to the collection;
  b) distributing a portion of the authority weight to the next page; and
  c) establishing the next page as the current page;
receiving a search query that is to be executed against the collection;
identifying a set of pages from the collection that match the search query;
determining how to present search results that list the pages that match the said search query based, at least in part, on the authority weights associated with the pages that match the search query; and
presenting the search results that list the pages that match the said search query based, at least in part, on the authority weights associated with the pages that match the search query.

2. The method of claim 1 wherein the step of determining how to present search results that list the pages that match the said search query includes determining a presentation order of the pages that match the search query based, at least in part, on the authority weights associated with the pages that match the search query.

3. A machine-readable storage medium carrying one or more sequences of instructions which, when executed by one or more processors, causes the one or more processors to perform the method recited in claim 2.

4. The method of claim 1 wherein the step of determining how to present search results that list the pages that match the said search query includes determining whether to highlight listings, within the search results, of the pages that match the search query based, at least in part, on the authority weights associated with the pages that match the search query.

5. A machine-readable storage medium carrying one or more sequences of instructions which, when executed by one or more processors, causes the one or more processors to perform the method recited in claim 4.

6. The method of claim 1, wherein the step of recursively distributing the page's authority weight until an end condition is satisfied includes recursively distributing the page's authority weight until a predetermined number of links are traversed.

7. A machine-readable storage medium carrying one or more sequences of instructions which, when executed by one or more processors, causes the one or more processors to perform the method recited in claim 6.

8. The method of claim 1, wherein the step of recursively distributing the page's authority weight until an end condition is satisfied includes recursively distributing the page's authority weight until a predetermined threshold of authority weight remains to be distributed.

9. A machine-readable storage medium carrying one or more sequences of instructions which, when executed by one or more processors, causes the one or more processors to perform the method recited in claim 8.

10. The method of claim 1, further comprising pre-computing an authority weight vector for a graph using a set of reference pages in the collection of pages.

11. The method of claim 10, further comprising combining an authority vector for one or more predetermined reference pages with an authority vector for one or more user-specific reference pages of the collection of pages.

12. A machine-readable storage medium carrying one or more sequences of instructions which, when executed by one or more processors, causes the one or more processors to perform the method recited in claim 10.

13. A machine-readable storage medium carrying one or more sequences of instructions which, when executed by one or more processors, causes the one or more processors to perform the method recited in claim 11.

14. A machine-readable storage medium carrying one or more sequences of instructions which, when executed by one or more processors, causes the one or more processors to perform the method recited in claim 1.

* * * * *